United States Patent [19]

Glowinski et al.

[11] 4,258,434

[45] Mar. 24, 1981

[54] BIT-BY-BIT TIME-DIVISION DIGITAL SWITCHING NETWORK

[76] Inventors: Albert Glowinski, Impasse des Vignes, Clamart, France, 92140; Pierre M. Lucas, 20 Rue Henri Tariel, Issy-les-Moulineaux, France, 92130

[21] Appl. No.: 49,225

[22] Filed: Jun. 18, 1979

[30] Foreign Application Priority Data

Jun. 29, 1978 [FR] France ................................ 78 19507

[51] Int. Cl.³ .......................... H04Q 11/04; H04J 6/00
[52] U.S. Cl. ....................................... 370/60; 370/67; 370/84
[58] Field of Search .................. 370/60, 84, 67, 92, 370/94, 80, 118, 44

[56] References Cited

U.S. PATENT DOCUMENTS

| | | | |
|---|---|---|---|
| 3,715,505 | 2/1973 | Gordon | 370/67 |
| 3,971,891 | 7/1976 | Wolcott | 370/80 |
| 3,988,674 | 10/1976 | Sciulli | 370/80 |
| 4,110,563 | 8/1978 | May | 370/80 |
| 4,117,269 | 9/1978 | Kampen | 370/67 |
| 4,119,795 | 10/1978 | Höelzl | 370/44 |

Primary Examiner—David L. Stewart
Attorney, Agent, or Firm—Abraham A. Saffitz

[57] ABSTRACT

A bit-by-bit time-division digital switching network switches a plurality of incoming and outgoing isochronous digital data channels having rates which are different but sub-multiples of a given low rate. After phasing said incoming digital channels, bits having a predetermined binary state are detected. Previously stored address words of said outgoing digital channels to be switched to said incoming digital channels are read-out and correspond to switched incoming channels whose detected bits have said predetermined binary state. Then the read outgoing channel address words are multiplexed into a multiplex digital highway at high rate. In the transmission part of each outgoing digital channel address words of said outgoing digital channel are detected. A bit at said predetermined binary state or a bit in the other binary state is transmitted on the outgoing digital channel in response to the detection or failure of detect the address word of said outgoing digital channel.

11 Claims, 8 Drawing Figures

BIT-BY-BIT TIME-DIVISION DIGITAL SWITCHING NETWORK

CROSS REFERENCES TO RELATED APPLICATIONS

Applicants hereby make cross references to their French patent application PV No. 78 19507, filed June 29, 1978 and claim priority thereunder following the provisions of 35 U.S.C. 119.

BACKGROUND OF THE INVENTION

1 Field of the invention

The present invention relates to a time-division digital switching network wherein incoming digital data channels are isochronous and not necessarily in phase and are switched to outgoing digital data channels. Each digital channel may be a single digital channel, all the data of which are switched to a single outgoing digital channel, or may be a digital component channel of an incoming time-division multiplex digital channel to be switched to at least one of the component digital channels of a number of outgoing time-division mulitplex digital channels.

2 Description of the prior art

As is known, a switching network of the aforementioned kind comprises a receiving and switching part which receives digital data from the incoming channels, wherein each incoming channel corresponds to at least one address of an outgoing digital channel. An intermediate time-division multiplex digital highway transmits words each of which comprises a part conveying data, such as octets or information packets transmitted by the associated incoming channels, and a part relating to the address of the outgoing channel for which the data are intended. A transmission part associates each outgoing digital channel with means for detecting the outgoing channel addresses and means for transmitting the corresponding demultiplexed data from the intermediate multiplex digital highway.

The address of the outgoing digital channel provided in the receiving part is made implicit, for example, if transmission on the intermediate multiplex highway is synchronous, i.e. if the words intended for the outgoing channels are time-division multiplexed in a given order. In the case where the data words have the same format, usually made up of 8 bits or 10 bits, transmission along the intermediate highway is of the conventional PCM kind and the part of each word relating to the address is not transmitted. If, on the contrary, the addresses of the outgoing channels are made explicit, i.e. if each word transmitted on the intermediate multiplex highway comprises both the two aforementioned part, each detection means detects the explicit address of the associated outgoing channel. In that case, transmission on the intermediate multiplex highway may be asynchronous, i.e. the words intended for the outgoing channels are not multiplexed in a predetermined order and the words associated with an outgoing channel are not detected periodically.

In both cases, known switching networks always transmit the implicit or explicit address part of the outgoing channel simultaneously with the part relating to data, which generally contains at least 8 bits.

OBJECTS OF THE INVENTION

The main object of the invention is to provide an undirectional time-division digital switching network wherein the number of addresses transmitted by the intermediate multiplex highway is greatly reduced, statistically by half, relative to the address number transmitted in prior-art networks.

Another object of the invention is to provide a time-division digital switching network wherein the addresses of the transmitted outgoing channels are explicit and the corresponding informations are implicit on the intermediate multiplex highway.

Another object of the invention is to provide a bit-by-bit time-division digital switching network for multiplexing the equal-rank bits of the data words of the incoming channels whose logic state is tranmitted in implicit form by asynchronous multiplexing of the addresses of the corresponding outgoing channels, which are transmitted only on the intermediate multiplex highway.

SUMMARY OF THE INVENTION

In general, according to the invention, each bit at a predetermined logic state, e.g. at state "1", transmitted by an incoming digital channel corresponds to tramission of the address of the corresponding outgoing channel on the intermediate multiplex highway. On the other hand, no transmission occurs on the intermediate highway, starting from the receiving part of the incoming channels, if a bit is received in the other logic state, i.e. in state "0".

According to the invention, a time-division digital switching network comprises means for selecting bits at a predetermined binary state and in phase from the incoming channels, multiplexing means which, during a time equal to the one-bit time slot of the incoming channels, multiplex only the addresses of outgoing channels which correspond to bits in phase at said predetermined binary state, so that the intermediate multiplex highway is made up of recurrent frames each statistically containing a number of outgoing channel addresses equal to half the number of incoming channels, and means for transmitting a bit at said predetermined binary state or a bit in the other binary state along each outgoing channel in response to the detection or absence of detection of the address of said out-going channel during a recurring frame at the rhythm of the corresponding incoming and outgoing channels.

To fix ideas, in the simple case where the incoming and out-going digital channels each transmits sample words of a single digital signal and have binary rates which are integer sub-multiplex $m_i$ of a given maximum binary rate of D bits/s, the receiving part stores the incoming data at the same rhythm as the bits from the incoming channels. On the other hand, the stored bits are read simultaneously with the rhythm of the local clock of the switching network, in order to select those bits which are received at the predetermined state "1" and transmits the corresponding addresses, which are multiplexed for a time less than the frame duration of 1/D second. Each frame on the intermediate multiplex highway is framed by a framing word and statistically contains a number of outgoing channel addresses equal to not more than half the number of all outgoing channel addresses when the rate of the switched incoming and outgoing channels is equal to D bits/s, or $m_i$ times less than the number of all outgoing channels addresses when the rate of all the switched incoming and outgoing channels is equal to $D/m_i$ bits/s. According to the invention, when a bit in state "0" and having the proba- bility 0.5 is received, no address is transmitted. In addition, since the addresses are transmitted in asynchronous form, i.e. since the addresses follow a framing word, a free time interval is advantageously available and can be used for transmitting digital supervisory, maintenance or similar signals.

The beginning of each highway frame is identified by a characteristic framing word. Consequently, after the framing word has been detected, it is only necessary to detect the presence or absence of an address word of the outgoing channel during the frame, in order to ensure that a bit having the state "1"or "0" is transmitted in the outgoing channel of the connection between an incoming channel and an outgoing channel operates at the rate of D bits/s. If a given connection between an incoming channel and an outgoing channel is made at a rate which is a integer submultiple $m_i$ of D, the transmission part of the outgoing channel will control address detection only once every $m_i$ frames.

In the case where the incoming and outgoing digital channels are each obtained by time-division multiplexing of a given number of components channels forming a recurrent frame and transmitting data words having a given number of bits, e.g. in the case of PCM channels transmitting octets, the equal-rank bits of the data words allocated to the component channels of each frame of an incoming channel are placed in parallel. Each outgoing component channel address multiplexed on the intermediate multiplex highway and corresponding to the transmission of a bit in state "1" from an incoming component channel is made up of a first part which identifies the address of the outgoing multiplex channel, and a second part which identifies the address of the component channel multiplexed in the outgoing multiplex channel and to be switched to the incoming component channel. In that case, the intermediate multiplex highway is made up of a recurrent multiframe having a duration equal to the minimum duration of a frame in the incoming multiplex channels. The number of frames in the multiframe is equal to the number of bits in the data words of incoming channel.

In the transmission part, each outgoing multiplex digital channel is associated with means for detecting the first address part and means for detecting the second address part, i.e. of the component channels of the outgoing multiplex channel. Two such detection operations can be used to bring about transmission of a bit in state "1" at a location or rank of the data word corresponding to the detection of the preceding framing word. In the contrary case, failure to detect the address of the outgoing component channel during the frame assigned to a given bit rank will be interpreted by a bit at the state "0" at the aforementioned word rank of the outgoing component channel.

BRIEF DESCRIPTION OF THE DRAWING

Other advantages of the invention will be apparent from the following more particular description of preferred embodiments of the invention, as illustrated in the accompanying drawings in which.

DESCRIPTION OF THE PREFERRED EMBODIMENTS

Figure 1:
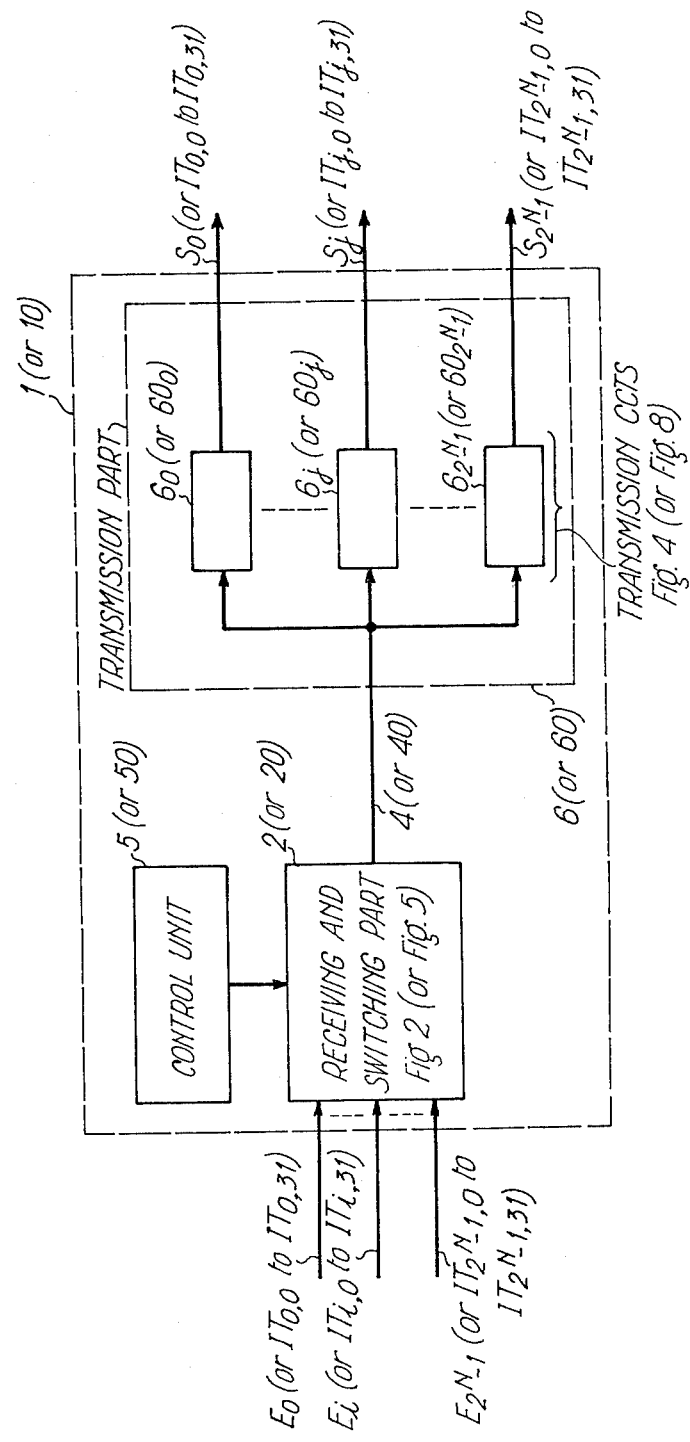
FIG. 1 is a general block-diagram of a bit-by-bit time-division digital switching network of this invention.

FIG. 1 is a block-diagram of a time-division digital switching network between up to $2^N$ incoming $E_i$ and outgoing $S_j$ isochronous time-division multiplex channels, where i and j vary from 0 to $2^N-1$. The channels are switched via a time-division digital switching network 1 embodying the invention. The switching network 1 comprises a receiving and switching part 2, a transmission part 6 and an intermediate multiplex highway 4 having a high rate. The receiving and switching part 2 switches each incoming channel $E_i$ with one of the outgoing channels $S_j$, and the transmission part 6 recognizes from the intermediate multiplex highway 4 the implicit information to be transmitted to each outgoing channel $S_j$. The intermediate multiplex highway 4 is obtained by implicit multiplexing of the explicit informations transmitted by the incoming channels $E_i$ after switching. The switching network 1 also contains a control unit 5 which delivers all the signals required for switching channels.

We shall first describe a first embodiment of switching bit-by-bit isochronous channels, each corresponding e.g. to a telephone channel. Each channel has a binary rate equal to a predetermined maximum rate D or a rate $D/m_i$ which is a sub-multiple of rate D. Switching occurs bit by bit. Each frame F of the intermediate highway 4 has a duration T and comprises up to $2^N+1$ words, some of which are explicit N-bit address words $A_j$ identifying the outgoing channels $S_j$ and one of which is a framing word FW also having e.g. N bits. Consequently, the binary flow rate of the intermediate highway 4 is equal to $(2^N+1) \times D \times N$ bits/s.

Figure 2:
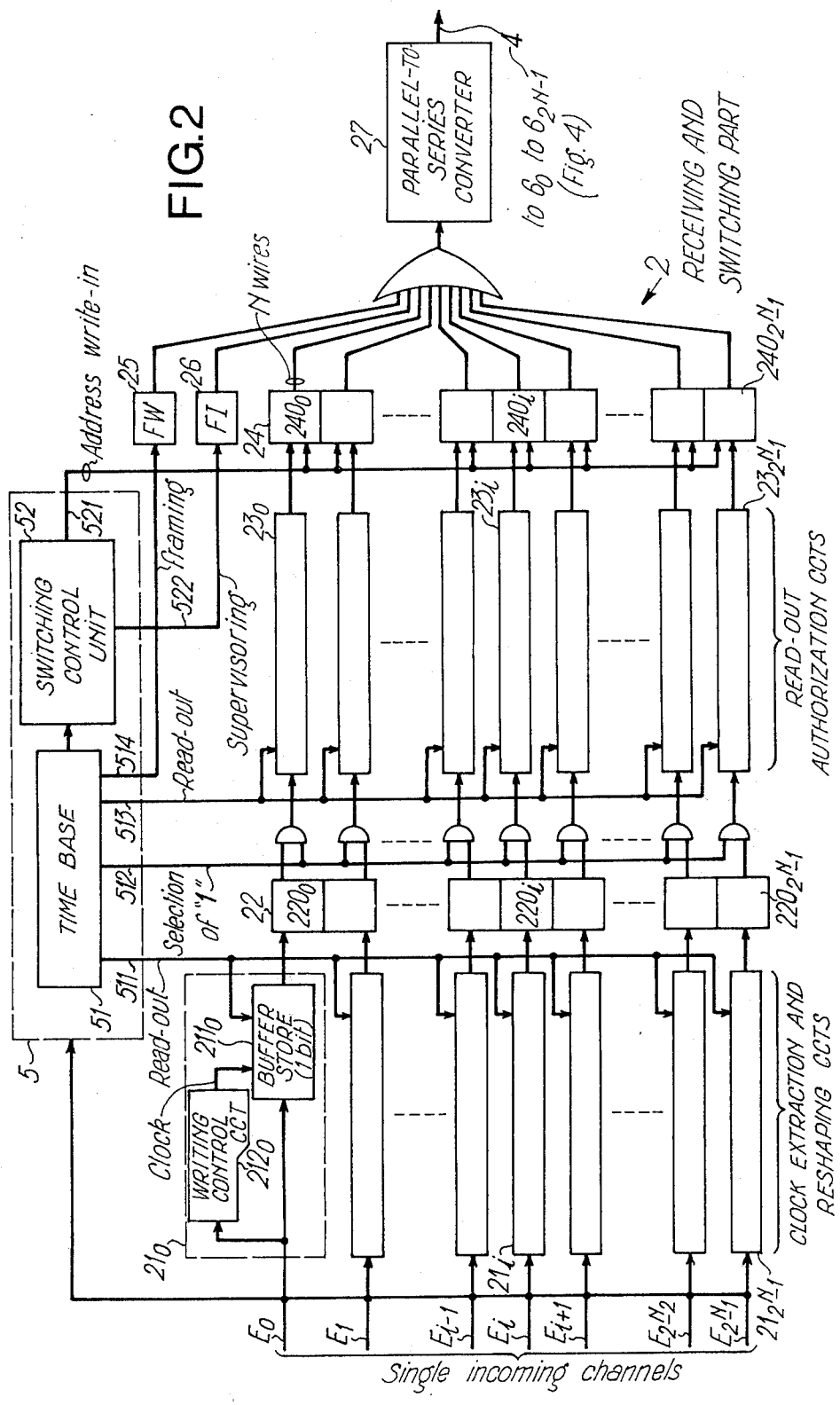
FIG. 2 is a block-diagram of the incoming channel receiving and switching part in a network for switching single digital channels.

FIG. 2 shows the receiving and switching part of the incoming channels 2 of the bit-by-bit time-division digital switching network in accordance with the first embodiment.

Each incoming channel $E_i$ is connected to the input of a clock extraction and reshaping circuit $21_i$ which converts the incoming digital signal from the code used in the incoming channel $E_i$ to the binary code used by the network, which phases and shapes the incoming channel signal and extracts the clos signal. Each circuit $21_i$ continuously writes a bit from the incoming channel $E_i$ at the transmission rate $D/m_i$ bits/s of the channel in a one-bit buffer store $211_i$ under the control of a writing control circuit $212_i$ and after extracting the clock signal at $D/m_i$ Hertz. The read-out of all the buffer stores $211_0$ to $211_{2^N-1}$ is simultaneously controlled by a signal transmitted by a local time base 51 along wire 511. The read-out control signal is transmitted at the beginning of each frame of duration T belonging to the intermediate multiplex highway. At this instant, the stored bit of an incoming channel $E_i$ is transmitted from the store $211_i$ to a one-bit storage cell $220_i$ of a buffer store 22. Next, the time base 51 transmits along wire 512 a read-out signal for reading-out the store 22 in order to select the cells $220_0$ to $220_{2^N-1}$ containing a bit at the predetermined state "1".

The bits in the state "1" are used, via read-out authorization circuits $23_0$ to $23_{2^N-1}$, to authorize the read-out of the corresponding storage cells $240_0$ to $240_{2^N-1}$ of a read-and-write address memory 24. Each cell $240_i$ contains one of the addresses $A_0$ to $A_{2^N-1}$ of the outgoing channels $S_0$ to $S_{2^N-1}$ connected to the incoming channels $E_0$ to $E_{2^N-1}$ in accordance with the desired connections. The rate of scanning the buffer store 22 which is triggered by the signal transmitted along wire 512, is such that the first bit in the state "1" is detected in less than the time occupied by an address word $A_j$ on the intermediate highway 4.

The control unit 5 will not be described in detail. The control unit 5 contains a switching control unit for deducing the address of the outgoing channel $S_j$ to be connected to the incoming channel $E_i$, starting from the supervision words which are transmitted before the date words in an incoming channel $E_i$. The switching orders, which correspond to selective writing orders of the cells of the read-and-write memory 24, are transmitted along the $2^N$-wire bus 521 at the end of each frame interval T and, if necessary, modify the contents of the selected storage cells $240_0$ to $240_{2^N-1}$ in order to make new connections between channels $E_i$ and $S_j$.

Figure 3:
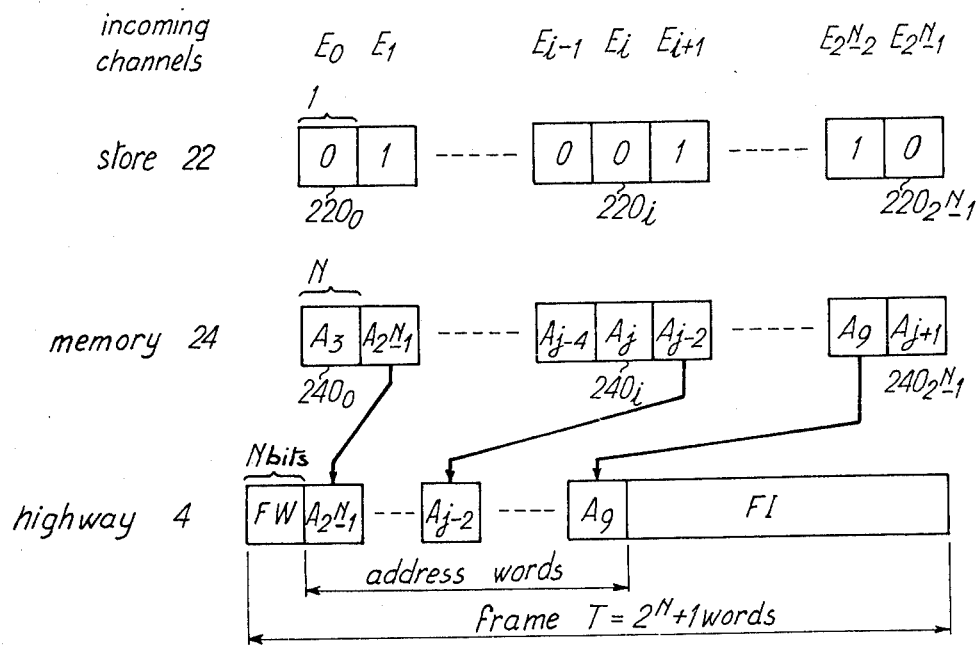
FIG. 3 shows an outgoing channel address frame transmitted from the receiving and switching part in FIG. 2 on the intermediate multiplex highway.

With reference to FIG. 3, it is assumed that, in the case of a given frame T, the incoming channels $E_0$, $E_1$, ... $E_{i-1}$, $E_i$, $E_{i+1}$, ... $E_{2^N-2}$, $E_{2^N-1}$ simultaneously transmit bits 0, 1, ... 0, 0, 1, ... 1, 0 respectively and are to be connected to the outgoing channels $S_3$, $S_{2^N-1}$, ... $S_{j-4}$, $S_j$, $S_{j-2}$, ... $S_9$, $S_{j+1}$, the address words of which are $A_3$, $A_{2^N-1}$, ... $A_{j-4}$, $A_j$, $A_{j-2}$, ... $A_9$, $A_{j+1}$ respectively. In this example, only the read-out authorization circuits such as $23_1$, ... $23_{i+1}$, ... $23_{2^N-1}$, which are associated with storage cells of the store 22 containing bits in state "1", authorize the successive read-outs of the corresponding storage cells $240_1$, ... $240_{i+1}$, ... $240_{2^N-1}$ under the control of the read-out order signals transmitted by the time base 51 on the bus 513. The read-out of the selected addresses $A_{2^N-1}$, ... $A_{j+2}$, ... $A_9$ is preceded by the read-out of the framing word FW which characterizes the frame in question from the recurrent multiframe (not shown) containing P consecutive frames of the same kind, where P is the smallest common multiple of the previously-defined integral sub-multiple $m_i$. The framing word FW is stored in a cell of a read-only memory 25 which read on receipt of an order from the time base 51 transmitted on a wire 514. The framing words FW in each multiframe are counted so that, at the beginning of each outgoing channel, the address words of the channel are read in the transmission part, as will be explained hereinafter. The read-out order signals produced by the read-out authorization circuits $23_0$ to $23_{2^N-1}$, after selecting a bit in the state "1", are transmitted in a given order, e.g. from cell $240_0$ to $240_{2^N-1}$, and so that all the transmitted address words $A_j$ come immediately after the transmission of the framing word FW, as shown in the last line of FIG. 3. This is followed by an interval FI free from address words at the end of each frame. The free interval FI has a duration which usually varies in each frame and is statistically as long as $2^{N-1}$ address words. The interval FI may advantageously be used to insert supervision words and/or other words, which are transmitted on receipt of a read-out order from a read-and-write memory 26 which is addresses in writing-in and read-out by the switching control unit 52 via a wire 522.

The framing word FW, the selected address words $A_j$ and the words in the free interval FI are read and multiplexed at the rhythm of $T/(2^N+1)$ seconds, starting from memories 25, 24 and 26. The words are transmitted in parallel along an N-wire bus at the rate of $(2^N+1) \times D$ words per second to the transmission part 6 or alternatively, as illustrated in FIG. 2, along the intermediate multiplex highway 4 at the binary rate of $(2^N+1) \times D \times N$ bits/s via a parallel-to-series converter 27.

As shown in FIG. 1, the transmission part 6 of the outgoing channels comprises $2^N$ transmission circuits $6_0$ to $6_{2^N-1}$ which have their outputs connected to the output channels $S_0$ to $S_{2^N-1}$ respectively. The input of each transmission circuit $6_j$ is connected to the intermediate multiplex highway 4, which transmits the multiplexed and selected addresses $A_j$. Since all the transmission circuits are identical, only one of them $6_j$ will be described hereinafter in detail.

Figure 4:
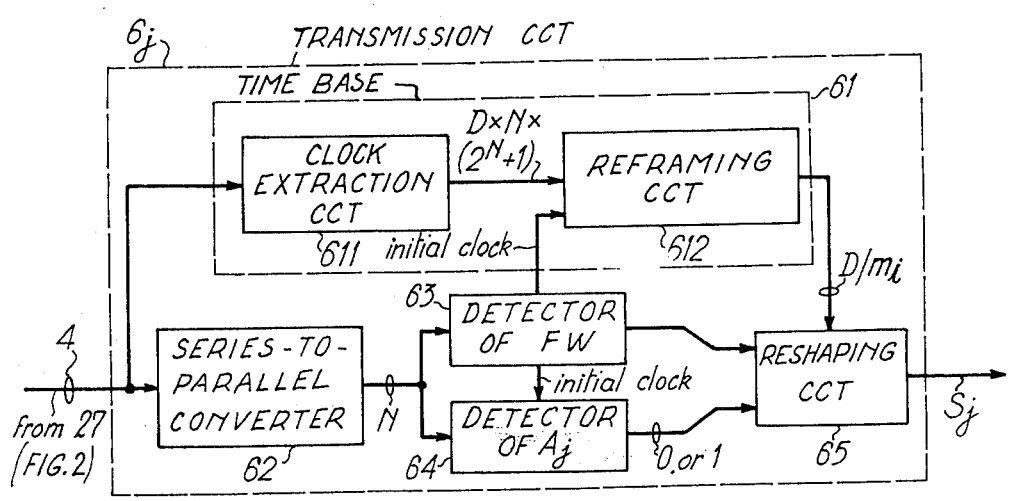
FIG. 4 is a block-diagram of a transmission circuit associated with a single outgoing channel to be switched to an incoming channel received in the receiving and switching part in FIG. 2.

Referring to FIG. 4, the transmission circuit $6_j$ comprises a time base 61 containing a clock extraction circuit 611 which extracts the clock signal from the bit transmission on the intermediate highway 4. The circuit 611 transmits the clock signal at the frequency of $(2^N+1) \times D \times N$ Hertz to a reframing circuit 612 which restores the binary rate $D/m_j$ of the outgoing channel $S_j$. The intermediate multiplex highway 4 is also connected, in accordance with the previously-considered case shown in FIG. 2, to the input of a series-to-parallel converter 62 which transmits the parallel N-bit words to two detectors 63 and 64. If the intermediate multiplex highway 4 is a link having N parallel wires, the channel is directly connected to the two detectors 63 and 64.

The detector 63 compares each N-bit word with at least one of the framing words FW from the multiframe on the multiplex highway 4 which, if required, precede the transmission of an address word $A_j$ identifying the assigned channel $S_j$. If the connection between two channels $E_i$ and $S_j$ is at the maximum rate D, each framing word FW, if required, precedes the transmission of an address word $A_j$. If, on the other hand, the channel connection $E_i$–$S_j$ is at a rate which is an integral sub-multiple $m_i$ of the rate D, an address word $A_j$ can be transmitted only after each $m_i$ framing word of the recurrent multiframe. To this end, the detector 63 comprises a read-only memory of the framing words FW which define the common binary rate of the connected channels $E_i$ and $S_j$. When the comparison is positive, a signal is transmitted to the reframing circuit 612 which then transmits the clock signal at the initial binary $D/m_i$ bits/s rate of channels $E_i$ and $S_j$. The clock signal is transmitted to the second detector 64 and to reshaping circuit 65 which converts the outgoing digital signal from the binary code used by the network to the code used in the outgoing channel $S_j$ and which shapes the outgoing channel signal.

The detector 64 compares each word of N parallel bits transmitted by the series-to-parallel converter 62 with the explicit address word $A_j$ previously stored in the detector 64. These comparisons follow each positive framing word comparison in the first detector 63. If no address word $A_j$ is detected, the detector 64 transmits a "0" bit to the reshaping circuit 65, whereas a "1" bit is transmitted in the contrary case. Consequently, the circuit 65 reshapes the bits at state "0" and "1" transmitted by the incoming channel $E_i$, and transmits them at the binary $D/m_i$ bits/s rate of the outgoing channel $S_j$. The "0" bits and the "1" bits correspond to the presence and absence of address words $A_j$ on the intermediate multiplex highway 4, respectively. In accordance with a second embodiment, we shall now describe a bit-by-bit time-division digital switching network 10, the general bloc-diagram of which is likewise as shown in FIG. 1, but which is adapted to switch component digital channels $IT_{i,h}$ which are multiplexed in incoming time-division multiplex channels $E_i$ and component digital channels $IT_{j,k}$ which are multiplexed in outgoing time-division multiplex channels $S_j$. In general, the incoming and outgoing multiplex channels are isochronous but not necessarily in phase. By way of non-limitative example, we shall assume that each incoming or outgoing multiplex channel is a PCM channel at the binary rate of 2.048 Mbits/s arising from time-division multiplexing of 32 component channels at the binary rate of 64 kbits/s. 30 channels are assigned to telephone channels proper and 2 being used for framing and supervisoring. Each time slot $IT_h$ or $IT_k$ (h and k varying from 0 to 31) allocated to the incoming or outgoing component channel is $125/32 = 3.9$ µs and transmits the eight bits of an octet in series.

In accordance with the principle of bit-by-bit switching according to the invention, the switching network 10 produces a multiplex of addresses similar to that described hereinbefore with reference to the first embodiment and FIGS. 2 and 3. The receiving and switching part 20 phases all the incoming PCM multiplex channels in order simultaneously to present the bits of the octets of the components channels $IT_{i,h}$ of all the incoming multiplex channels $E_i$ which have the same rank r, where r varies from 0 to 7. The part 20 also detects all the bits occurring simultaneosuly at the state "1" in order to match each bit with an explicit address of a component channel $IT_{j,k}$ of an outgoing multiplex channel $S_j$. In the present case, the intermediate multiplex highway 40 between the receiving part 20 and the transmission part 60 comprises a recurrent multiframe made up of 8 consecutive frames each triggered by a framing word $FW_r$. Each frame corresponds to the multiplexing of up to $32 \times 2^N$ address words $A_j$. Each address word comprises a first N-bit part which identifies the outgoing multiplex channel $S_j$ as in the first embodiment, and a second 5-bit part which identifies the component channel $IT_{j,0}$ to $IT_{j,31}$ of the outgoing multiplex channel $S_j$. Consequently, the binary rate of the intermediate multiplex highway 40 is $2.048 \times (2^N + 1/32)(N + 5)$ Mbits/s, assuming that each framing word FW also contains $(N+5)$ bits.

Figure 5:
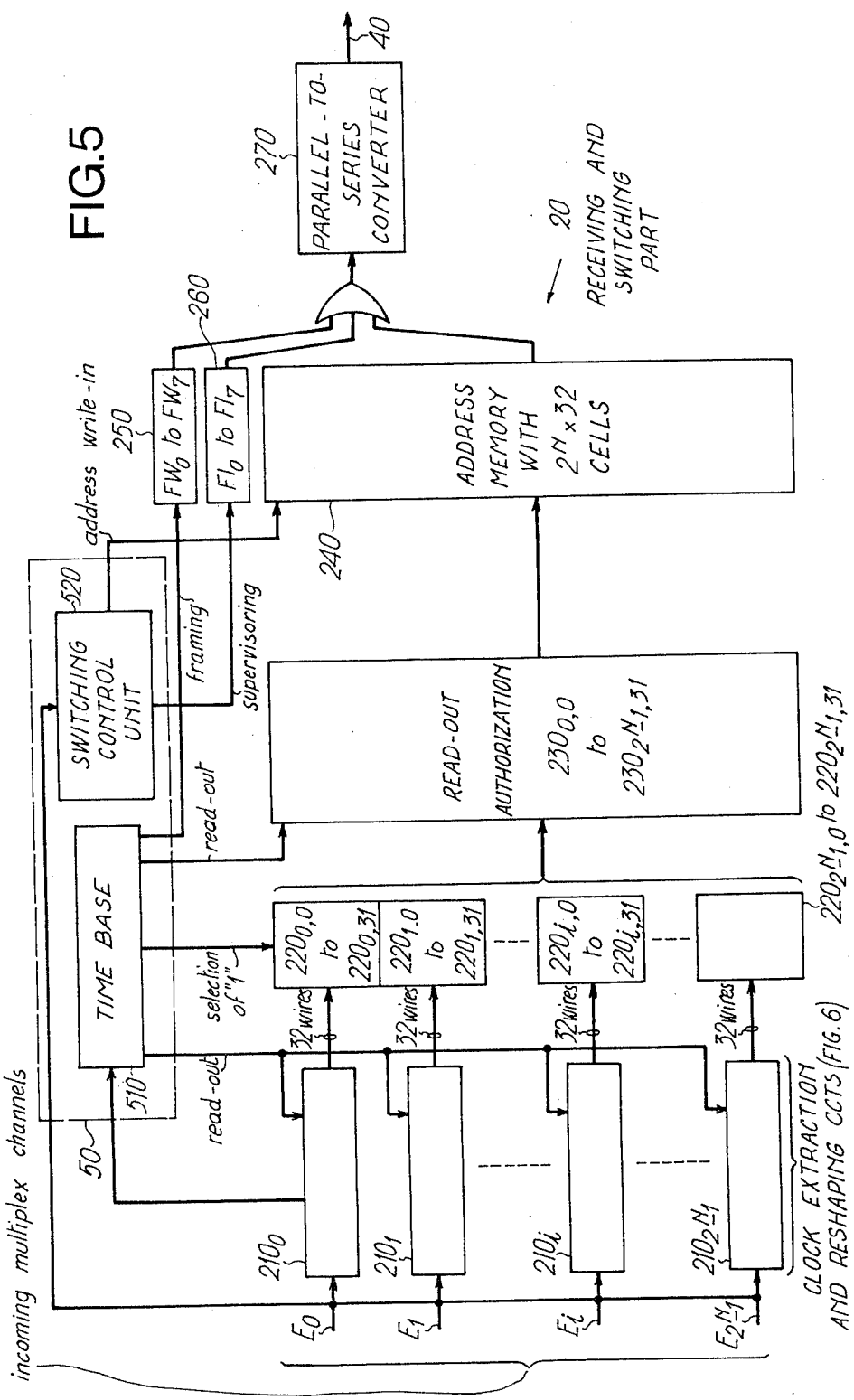
FIG. 5 is a block-diagram of the incoming channel receiving and switching part in a network for switching component digital channels of multiplex channels.

As shown in FIG. 5, the receiving and switching part 20 comprises component circuits similar to those in FIG. 2, the main difference being that the number of storage cells of the memories 220, 240 and read-out authorization circuits 230 corresponding to 21, 22 and 24 in the first embodiment shown in FIG. 2, is $2^N \times 32$. Instead of each incoming channel $E_i$ supplying a bit whose state will be implicitly transmitted by the address of an outgoing channel $S_j$, each incoming PCM multiplex channel $E_i$ delivers in synchronism 32 bits which have a same rank r and belong to each of its components channels $IT_{i,0}$ to $IT_{i,31}$ and to which correspond 32 outgoing component channel addresses $A_{j,k}$ among the $32 \times 2^N$ previously stored under the control of the switching control unit 520 in accordance with the required connections $IT_{i,h}$–$IT_{j,k}$. The subscript h varies from 0 to 31 and denotes the component channel $IT_h$ of the incoming multiplexed PCM channel $E_i$ to be connected to a component channel $IT_k$ having a subscript k of an outgoing multiplex PCM channel $S_j$, where k varies from 0 to 31.

Clock extraction and reshaping circuits $210_0$ to $210_{2^N-1}$ are assigned to the incoming multiplex channels $E_0$ to $E_{2^N-1}$ respectively and have a structure different of the circuits $21_0$ to $21_{2^N-1}$ illustrated in FIG. 2. A circuit $210_i$ is adapted (a) to phase the incoming PCM channel $E_i$ with the local time base 510 and (b) to rearrange the component channels $IT_{i,0}$ to $IT_{i,31}$ so that each incoming component channel simultaneously presents a bit having the same rank, for the purpose of bit-by-bit switching.

Figure 6:
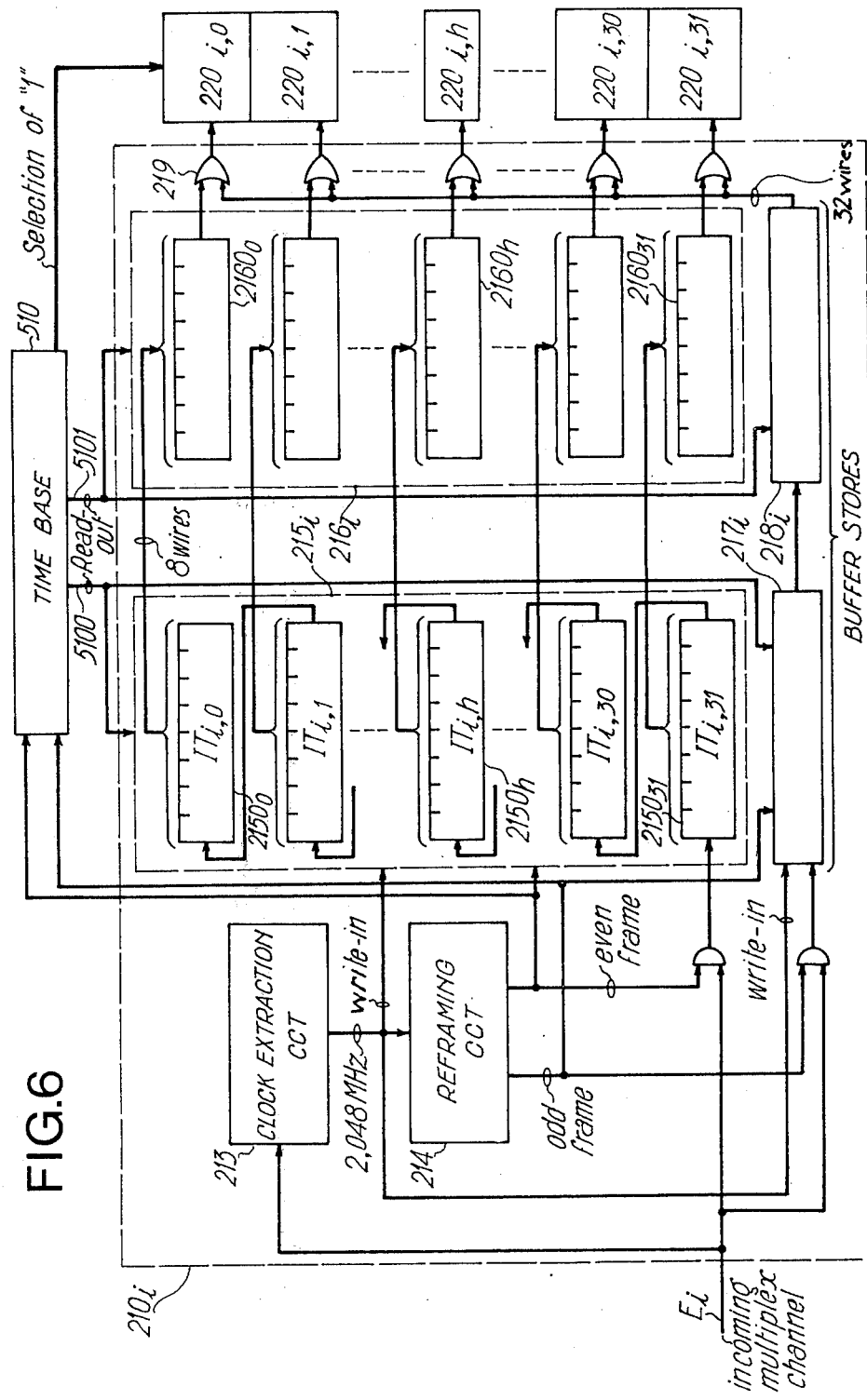
FIG. 6 shows a clock extraction and reshaping circuit of the receiving part in FIG. 5 which is associated with an incoming multiplex channel.

Since all the circuits $210_0$ to $210_{2^N-1}$ are identical, only one circuit $210_i$ is illustrated in FIG. 6. It comprises a clock extraction circuit 213 which extracts the clock signal at 2.048 MHz transmitted on the incoming channel $E_i$, and a reframing circuit 214 of which the framing signal is at a frequency of 8 kHz, i.e. at the sampling frequency of the component channels $IT_{i,h}$. The circuit $210_i$ also contains pairs of buffer stores $215_i$–$216_i$ and $217_i$–$218_i$ each adapted to process the successive odd and even PCM incoming frames. The PCM incoming frames are separated in order to rearrange the bits of an event frame at a rhythm which is a multiple of the binary rate of the intermediate multiplex highway 40, i.e. at the same rhythm as the local time base 510, during which time the odd frame is simultaneously written, and vice versa. Consequently, each pair of buffer stores $215_i$–$216_i$ or $217_i$–$218_i$ stores a frame during $2 \times 125$ µs = 250 µs. Since the pairs of buffer stores are identical, only the stores $215_i$ and $216_i$ for the even frames have been shown in detail in FIG. 6.

The store $215_i$ comprises 32 8-bit shifting registers $2150_0$ to $2150_{31}$ which, under the control of the reframing circuit 214 after the latter has detected a framing word for an even frame, are connected in series with the $E_i$ input in the order of decreasing subscripts h, i.e. $2150_{31}$ to $2150_0$. During this frame period, therefore, the store $215_i$ constitutes a single shifting register comprising $32 \times 8 = 256$ bit compartments. At the end of an even frame, each register $2150_h$ has registered the octet corresponding to the component channel $IT_{i,h}$ and all the bits of the octet having the same rank r are arranged along a single column. At this instant, a signal transmitted on a wire 5100 by the time base 510 simultaneously brings about the rapid transfer of the 8 parallel bits of the octets from registers $2150_0$ to $2150_{31}$ to 8-bit shifting registers $2160_0$ to $2160_{31}$, which make up the second store $216_i$. Simultaneously also, the shifting registers in buffer store $217_i$ are connected in series so as to store the subsequent component octets during the subsequent odd PCM frame, in a manner similar to the preceding storing operation.

During the storing of the aforementioned next odd frame, the octets in the preceding even PCM frame are processed bit by bit, i.e. each bit of equal rank in the store $216_i$ or by moving the columns in store $216_i$ to the right.

The $2^N$ groups of 32 bits of equal rank r are read and transferred in parallel, starting from the $2^N$ stores $216_0$ to $216_{2^N-1}$, to the corresponding storage cells $220_{i,h}$ of the store 220 via OR-gates 209 at the frequency of 64 kHz transmitted from the time base 510 on a wire 5101. This frequency of 64 kHz corresponds to the frequency of the recurrent frames $F_0$ to $F_7$ in the intermediate multiplex highway 4.

Figure 7:
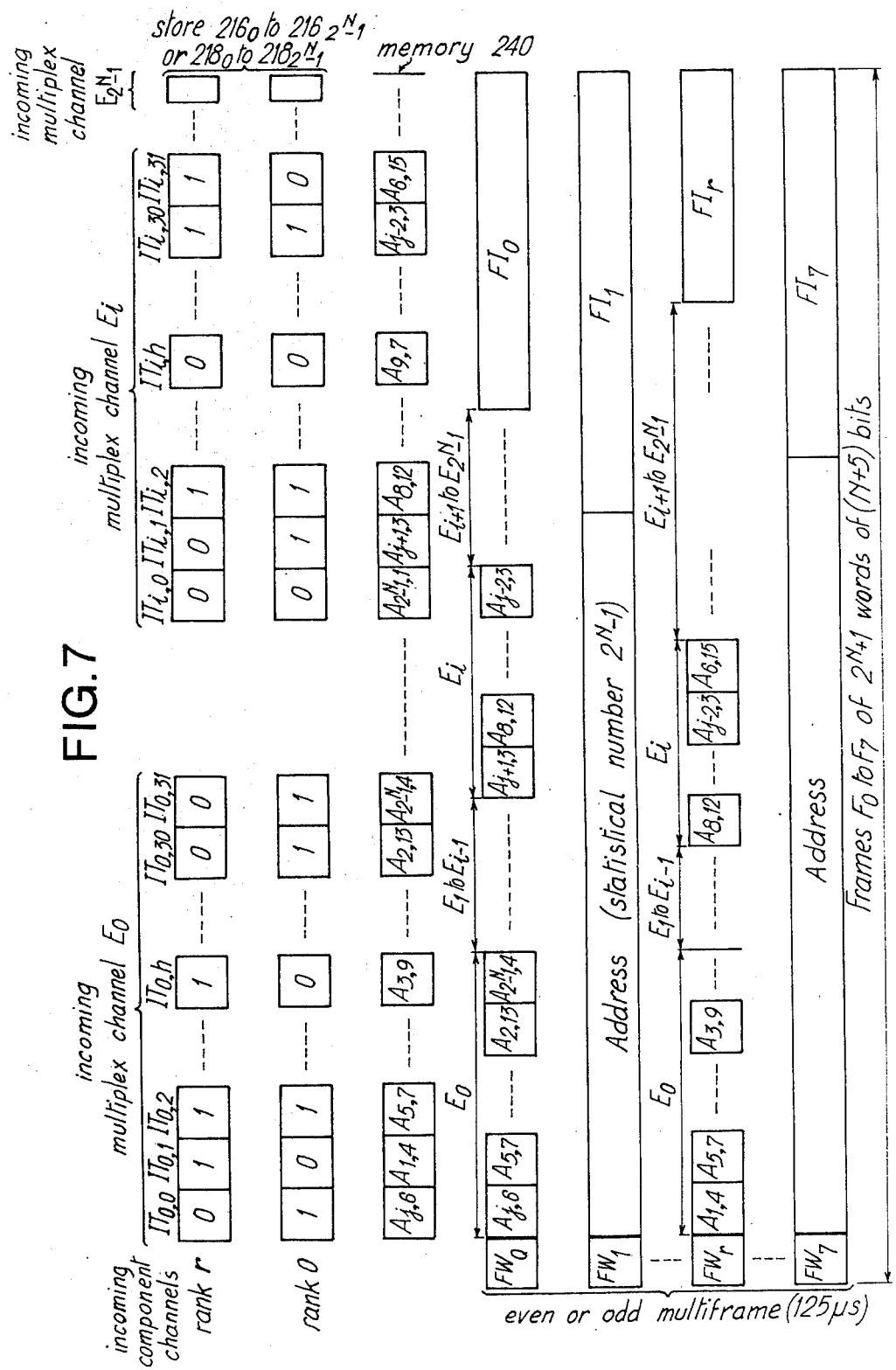
FIG. 7 shows the outgoing component channel address multiframe transmitted from the receiving and switching part in FIG. 5 on the intermediate multiplex highway.

By way of example, the first two lines in FiG. 7 show the rank-r bits and rank-0 bits of the component channels $IT_0, IT_1, \ldots IT_h, \ldots IT_{30}, IT_{31}$ of each of the incoming multiplex channels $E_0$ and $E_i$ which are stores at a given instant in the rank-0 and rank-r compartments of the respective shifting registers $2160_0$ to $2160_{31}$ of stores $216_0$ and $216_i$. It is assumed that the rank-0 bits of the aforementioned component channels $E_0$ and $E_i$ are equal to 1, 0, 1, ... 0, ... 1, 1 and 0, 1, 1, ... 0, ... 1, 0 and that the rank-r bitsare equal to 0 1, 1, ... 1, ... 0, 0 and 0, 0, 1, ... 0, ... 1, 1 respectively. It is also assumed that, at the same instant, the connections between the aforementioned incoming component channels $IT_{i,h}$ and the outgoing component channels $IT_{j,k}$ are the following: $IT_{0,0}-IT_{j,6}, IT_{0,1}-IT_{1,4}, IT_{0,2}-IT_{5,7}, \ldots IT_{0,h}-IT_{3,9}, \ldots IT_{0,30}-IT_{2,13}, IT_{0,31}-IT_{2N-1,4}$ for the incoming multiplex channel $E_0$ and $IT_{i,0}-IT_{2N-1,1}, IT_{i,1}-IT_{j+1,3}, IT_{i,2}-IT_{8,12}, \ldots IT_{i,h}-IT_{9,7}, \ldots IT_{i,30}-IT_{j-2,3}, IT_{i,31}-IT_{6,15}$ for the incoming multiplex channel $E_i$. As previously stated, the addresses $A_{j,k}$ of the corresponding outgoing component channels $IT_{j,k}$ shown in the third line of FiG. 7 are previously stored in the storage cells of the address memory 240 under control of the switching unit 520 and are selectively read and multiplexed at a frequency of 2.048 MHz as soon as the corresponding read-out authorization circuits $230_0$ to $230_{2N-1,31}$ have recognized bits in the state "1", as in the first embodiment.

Thus, each address $A_{j,6}, A_{5,7}, \ldots A_{2,13}, A_{2N-1,4}$ corresponding to the connections of the incoming multiplex channel $E_0$ is read-out, followed by the addresses corresponding to the incoming channels $E_1$ to $E_{2N-1}$ after the rank-0 bits in state "1" have been detected. The addresses are multiplexed and transmitted continuously, after the framing word $FW_0$ which characterizes the rank-0 bits, as shown in the fourth line of FIG. 7. A free time interval $FI_0$ is then available for transmitting supervisory or similar data, if required. Next, the 1 to 7 rank bits are read at the frequency of 64 kHz by shifting octets in the shifting registers of the buffer stores $216_0$ to $216_{2N-1}$. Each read-out operation is preceded by the framing word $FW_1$ to $FW_7$ which characterizes the 1 to 7 rank bit, and is followed by a free time interval $FI_1$ to $FI_7$. Usually, the free time intervals are different. As shown in FIG. 5, each framing word is read from a read-only memory 250 under the control of the time base 510 and each set of supervisory words, if required, can be read from a read-and-write memory 260 under the control of the switching control unit 520.

Next, the framing, addressing and, if required, supervisory words are transmitted as in the first embodiment, either in parallel on an 8-wire link constituting the intermediate multiplex highway 40 or in series via a parallel-to-series converter 270 as illustrated in FIG. 5. When the even multiframe has thus been formed, after processing the octets in all the buffer stores $216_0$ to $216_{2N-1}$, the downstream octets are processed in all the buffer stores $218_0$ to $218_{2N-1}$ in order to make up the next odd multiframe.

Figure 8:
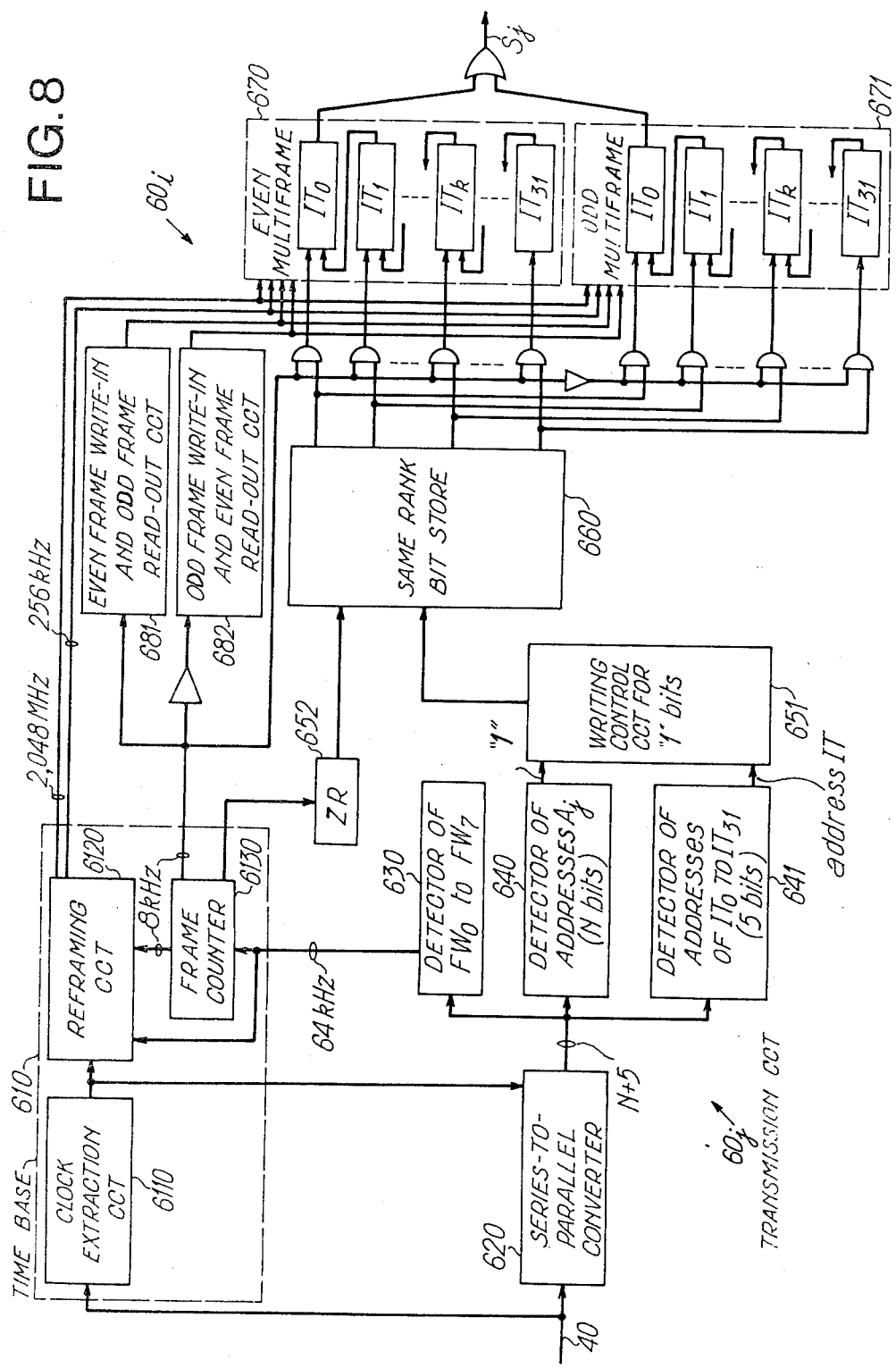
FIG. 8 is a block-diagram of a transmission circuit associated with a multiplex outgoing channel.

As already stated with reference to FIG. 1 and the first embodiment, the transmission part 60 comprises $2^N$ transmission circuits $60_0$ to $60_{2N-1}$ which have identical structures and the outputs of which are connected to the outgoing time-division multiplex channels $S_0$ to $S_{2N-1}$ respectively. The inputs of the transmission circuits are connected to the intermediate multiplex highway 40. One of these transmission circuits $60_j$ is shown in detail in FIG. 8.

The intermediate multiplex highway 40 is connected to the inputs of a time base 610 and a series-to-parallel converter 620 when the highway 40 is a single multiplex link. The time base 610 comprises a clock extraction circuit 6110 which extracts the clock signal at $2.048 \times (2^N + 1/32)(N+5)$ Hz from the incoming multiplex digital signal transmitted on the highway 40. The circuit 6110 is connected to a reframing circuit 6120 which transmits the clock frequencies at 2.048 MHz and 256 kHz. At the output of converter 620, the N+5 bit address words $A_{j,k}$ and inter alia the framing words $FW_0$ to $FW_7$ are transmitted via a (N+5)-wire bus to three detectors 630, 640 and 641. Each detector comprises a circuit for comparing each transmitted (N+5)-bit word with one or more previously-stored given words.

The detector 630 compares the transmitted words with the eight framing words $FW_0$ to $FW_7$ identifying the bit ranks r of the incoming PCM channel octets, and produces the clock frequency of 64 kHz. A frame counter 6130 of the time base 610 is connected to the detector 631 and produces the 8kHz multiframe frequency in order to distinguish between even and odd multiframes.

The detectors 640 and 641 recognize if an address word $A_{j,k}$ corresponding to the transmission of a state "1" bit is intended for the associated outgoing channel $S_j$. The detector 640 compares the first N-bit part of each transmitted address word $A_{j,k}$ with the N-bit address word $A_j$. The detector 641 compares the second 5-bit part of each transmitted address word $A_{j,k}$ with the 32 5-bit address words of the component channels $IT_{j,0}$ to $IT_{j,31}$ of the outgoing channel $S_j$. If the address $A_j$ is detected by detector 640, a writing control circuit 651 for state "1" bits inscribes the last-mentioned bits having the same rank r in those among 32 cells of a store 660 which correspond to the addresses of the component channels $IT_{j,k}$ detected by detector 641. The writing-in operation in the store 660 is performed in parallel for a time less than the duration of a frame of the intermediate highway 40, i.e. $125/8 = 15.625$ μs. The other cells of the store 660 which has been reset to zero at the beginning of each frame by a zero resetting circuit 652 connected to the frame counter 6130, remain at state "0". Thus, the state "0" bits in the store 660 correspond to the state "0" bits of similar rank in the component channels $IT_{i,h}$ of the incoming multiplex channels $E_0$ to $E_{2N-1}$ in conjunction with the component channels $IT_{j,k}$ of the outgoing channel $S_j$, i.e. the incoming component channels which have not brought about a transmission of addresses along the intermediate highway 40.

The bits for similar rank r are in parallel in the store 660. Two stores 670 and 671 are respectively associated with the even and odd multiframes of the intermediate highway 40 or with the even and odd frames of the outgoing multiplex PCM channel $S_j$. The stores 670 and 671 combine the bits of similar rank into parallel octets in the opposite manner to the combinations brought about by the stores $215_i-216_i$ and $217_i-218_i$ in FIG. 6. To this end, 8 successive groups of 32 parallel bits successively stores in store 660 are written in the even frame store 670 whereas the 32 octets corresponding to the 8 previously-transmitted successive groups of 32 parallel bits are read in the odd frame store 671 and vice versa.

A circuit 681 transmits the write-on orders of the even frames and the read-out orders of the odd frames and a circuit 682 transmits the write-in orders of the odd frames and the read-out orders of the even frames to the stores 670 and 671 based on the 8 kHz frame frequency from the counter 8 kHz. The groups of 32 parallel bits are written at the frequency of 256 kHz into the 32 shifting registers of the store 670 or 671, each shifting register storing the complete octet of a channel $IT_{j,k}$ after a multiframe period of 125μs. Next during the subsequent multiframe period the octets $IT_{j,0}$ to $IT_{j,31}$ stored in parallel are read in the same order in series by connecting the 32 shifting registers of the store 670 or 671 in series, and the transmitted onto the outgoing channel $S_j$.

Although the invention has been described with reference to particular embodiments and with reference to words having a given bit number and at given binary rates, variants are possible and can easily be devised by the skilled addresses and remain within the scope of the invention as defined in the annexed claims. Furthermore, the second embodiment has been described with reference to incoming and outgoing multiplex channels having the same rate, whereas a multirate switching network can be constructed according to the invention for switching multiplex channels having rates which are different but are integral sub-multiples of a same rate. In this case, the reading-out and writing-in of the stores 216–218 and 670–671 will occur at a sub-multiple of the frequency of the multiframes in the intermediate multiplex highway of the frames in the incoming and outgoing multiplex channels. Finally, the principle of bit-by-bit switching is unchanged when the connections are other than point-to-point (-to-1) as envisaged in the preceding description. For example, each single incoming channel or each component channel of an incoming multiplex channel can correspond to a number Q of outgoing channels, in order to make multipoint connections 1 to Q.

What we claim is:

1. A time-division digital switching network for switching a plurality of incoming and outgoing isochronous digital data channels having rates which are different but sub-multiples of a given low rate, said switching network comprising:

means for phasing said incoming digital channels;

means for detecting bits having a predetermined binary state from the phased incoming digital channels;

means for storing address words of said outgoing digital channels to be switched to said incoming digital channels;

means controlled by said predetermined by binary state bit detecting means for reading stored outgoing channel address words which correspond to switched incoming channels whose detected bits have said predetermined binary state;

means for multiplexing the read outgoing channel address words into an address word multiplex digital highway at high rate;

means interconnected to said multiplex digital highway and each outgoing digital channel for detecting said address words of said outgoing digital channel; and means associated with each outgoing digital channel and controlled by said address word detecting means for transmitting a bit at said predetermined binary state or a bit in the other binary state on said outgoing digital channel in response to the respective detection or failure to detect said address word of said outgoing digital channel.

2. A time-division digital switching network according to claim 1 comprising:

means for transmitting a number of framing words equal to said given number of data word bits on said multiplex digital highway, each highway frame comprising a framing word and said multiplexed outgoing channel address words corresponding to the detection of incoming channel bit having said predetermined binary state and a same rank in said incoming channel data words; and means connected to said multiplex digital highway for detecting said framing words thereby controlling in function of the rate of each outgoing channel said address word detecting means in response to a framing word.

3. A time-division digital switching network according to claim 2 in which said address words of each frame succeed immediately to said framing word and are followed by a free time interval having a duration statistically equal to that of the time interval allocated to multiplexed address words of outgoing channels.

4. A time-division digital switching network according to claim 2, comprising means for transmitting predetermined data words other than those transmitted from said incoming digital channels on said multiplex digital highway, said predetermined data words being transmitted into time intervals of said frames which have a duration statistically equal to that of the time intervals allocated to multiplexed address words of outgoing channels.

5. A time-division digital switching network according to claim 2 in which $2^N$ incoming channels are switched with $2^N$ outgoing channels, said address words being each made up of N bits, and in which said address word multiplex digital highway is made up frames each containing $2^N+1$ words, of which not more than $2^N$ are address words and one is an N-bit framing word and has a binary rate equal to $(2^N+1)N$ times said given low rate.

6. A time-division digital switching network for switching a plurality of incoming and outgoing isochronous digital data channels transmitting data words consisting of a given number of bits and having rates which are different but sub-multiples of a given low rate, said switching network comprising:

means for phasing said incoming digital channels;

means for storing the bits having an equal rank in said phased incoming channel data words;

means for detecting stored equal rank bits having a predetermined binary state;

means for storing address words of said outgoing digital channels to be switched to said incoming digital channels;

means controlled by said predetermined binary state bit detecting means for reading stored outgoing channel address words corresponding to switched incoming channels whose bits have said predetermined binary state and a same rank;

means for multiplexing the read outgoing channel address words into an address word multiplex digital highway at high rate;

means connected to said multiplex digital highway for detecting said address words of each outgoing digital channel; and means controlled by said address word detecting means for transmitting a bit having said predetermined binary state or the other binary state into said rank of a data word of said outgoing digital channel in response to the respective detection or failure to detect said address word of said outgoing digital channel.

7. A time-division digital switching network for switching a plurality of incoming and outgoing component digital data channels time-division multiplexed into incoming and outgoing multiplex data channels having rates which are different but sub-multiples of a given low rate, said component transmitting data words consisting of a given number of bits and being arranged in predetermined data word positions in incoming and outgoing multiplex channel frames, said switching network comprising:

means for phasing said incoming multiplex channels;

means for storing the bits having an equal rank in the incoming channel data words belonging to the phased incoming channel frames;

means for detecting stored equal rank bits having a predetermined binary state;

means for storing outgoing component channel address words having first and second parts, whose first part is the address of an outgoing multiplex channel and whose second part is the address of the outgoing component channel of said outgoing multiplex channel to be switched to an incoming component channel of an incoming multiplex channel;

means controlled by said predetermined binary state bit detecting means for reading stored address words corresponding to switched incoming component channels, whose stored bits have said predetermined binary state and said same rank;

means for multiplexing the read outgoing component channel address words into an address word multiplex digital highway at high rate;

means connected to said multiplex digital highway for detecting said first part of said address words of each outgoing multiplex channel;

means connected to said multiplex digital highway and controlled by said first address word part detecting means for detecting said second part of said address words of each outgoing component channel of said outgoing multiplex channel; and means controlled by said first and second address word part detecting means for transmitting a bit having said predetermined binary state or the other binary state into said rank of a data word of said outgoing component channel of said outgoing multiplex channel in response to the respective detection or failure to detect said first and second address word parts of said outgoing component channel.

8. A time-division digital switching network according to claim 7 comprising means for transmitting a number of framing words equal to said given number of data word bits on said multiplex digital highway, each highway frame comprising a framing word and said multiplexed outgoing component channel address words corresponding to the detection of incoming component channel bits having said predetermined binary state and a same rank in said data words of said incoming component channel data words of said incoming multiplex channel frames, and said multiplex digital highway conveying recurrent multiframe comprising a number of said highway frames equal to said given number of word bits, and means connected to said multiplex digital highway for detecting said framing words thereby controlling in function of said rate of each outgoing multiplex channel said first and second address word part detecting means in response to a framing word.

9. A time-division digital switching network according to claim 8 in which said address words of each highway frame succeed immediately to said framing word and are followed by a free time interval having a duration statistically equal to that of the time interval allocated to said multiplex address words of outgoing component channels of outgoing multiplex channels.

10. A time-division digital switching network according to claim 8 comprising means for transmitting predetermined data words other than those transmitted from said incoming component channels on said multiplex digital highway, said predetermined data words being transmitted into time intervals of said highway frames which have a duration statistically equal to that of the time intervals allocated to said multiplexed address words of outgoing component channels of outgoing multiplex channels.

11. A time-division digital switching network according to claim 8 in which $2^M$ component channels of $2^N$ incoming multiplex channels are switched with $2^M$ component channels of $2^N$ outgoing multiplex channels, said address words each comprising a first part having N bits and a second part having M bits, and said data word in said component channels each comprising r bits, and in which said address word multiplex digital highway is made up of a multiframe of r frames, each highway frame being made up of $(2^{M+N})+1$ words, of which not more than $2^{M+N}$ are address words and one is a (N+M) bit framing word, and has a binary rate equal to $(2^N+2^{-M})$ (M+N) times said given low rate.

* * * * *